United States Patent [19]

Nijenhuis et al.

[11] Patent Number: 6,060,580
[45] Date of Patent: May 9, 2000

[54] STAR-SHAPED BRANCHED POLYAMIDE

[75] Inventors: Atze J Nijenhuis; Martien Serné, both of Sittard; Ellen M. M. de Brabander-van den Berg, Schinnen; René Aberson, Sittard, all of Netherlands

[73] Assignee: DSM N. V., Heerlen, Netherlands

[21] Appl. No.: 08/962,675

[22] Filed: Nov. 3, 1997

Related U.S. Application Data

[63] Continuation of application No. PCT/NL96/00188, May 2, 1996.

[30] Foreign Application Priority Data

| May 3, 1995 | [EP] | European Pat. Off. | 95201141 |
| Sep. 18, 1995 | [BE] | Belgium | 9500757 |

[51] Int. Cl.$^7$ ................................................. C08G 73/00
[52] U.S. Cl. .................. 528/332; 528/310; 528/322; 528/363; 528/422; 525/418; 524/765; 524/779; 524/781; 524/785; 424/DIG. 16
[58] Field of Search .................................. 528/310, 322, 528/332, 363, 422; 525/418; 524/765, 779, 781, 785; 424/DIG. 16

[56] References Cited

U.S. PATENT DOCUMENTS

| 5,530,092 | 6/1996 | Meijer | 528/363 |
| 5,610,268 | 3/1997 | Meijer et al. | 528/363 |
| 5,698,662 | 12/1997 | Stoelwinder et al. | 528/363 |

FOREIGN PATENT DOCUMENTS

| 115771 | 8/1984 | European Pat. Off. . |

OTHER PUBLICATIONS

Chemical Engineering News Dendrimers Fundamental Studies Suggest Unique Applications, pp. 28–30, Sep. 27, 1997, Stephen C. Stinson.

J. Am. Chem. Soc. 70, 2709–18 (Aug. 1948), G. R. Schaefgen et al "Synthesis of Multichain Polymers & Investigation of their Viscosities".

Chem. Mater. Sep./Oct., 1992, 4, pp. 1000–1004, G. M. Wara Komski, "Synthesis & Properties of Star–Branched Nylon 6".

*Primary Examiner*—P. Hampton-Hightower
*Attorney, Agent, or Firm*—Pillsbury Madison & Sutro LLP

[57] ABSTRACT

The invention relates to a star-shaped branched polyamide that has a high thermal stability and can be produced in existing production facilities for the corresponding linear polyamide. This is achieved by allowing the polyamide branches, at least three, to be formed from a multifunctional core having functional groups chosen from the group comprising amine and carboxyl groups, the amine or carboxyl groups being bound to an acyclic compound in which branching occures, if it is branched, at a carbon atom, or via an acyclic chain to a heterocyclic compound showing point symmetry.

The process for the preparation is carried out under the conditions of the preparation of the corresponding linear polyamide. It proves to be possible to obtain, after shorter polymerization times, a product with mechanical properties that are comparable with those of the linear polyamide after significantly longer polymerization times.

Examples of suitable multifunctional nuclei are 2,4,6-trisaminocaproic acid-1,3,5-triazine and 4-aminomethyl-1,1-octanediamine.

20 Claims, 1 Drawing Sheet

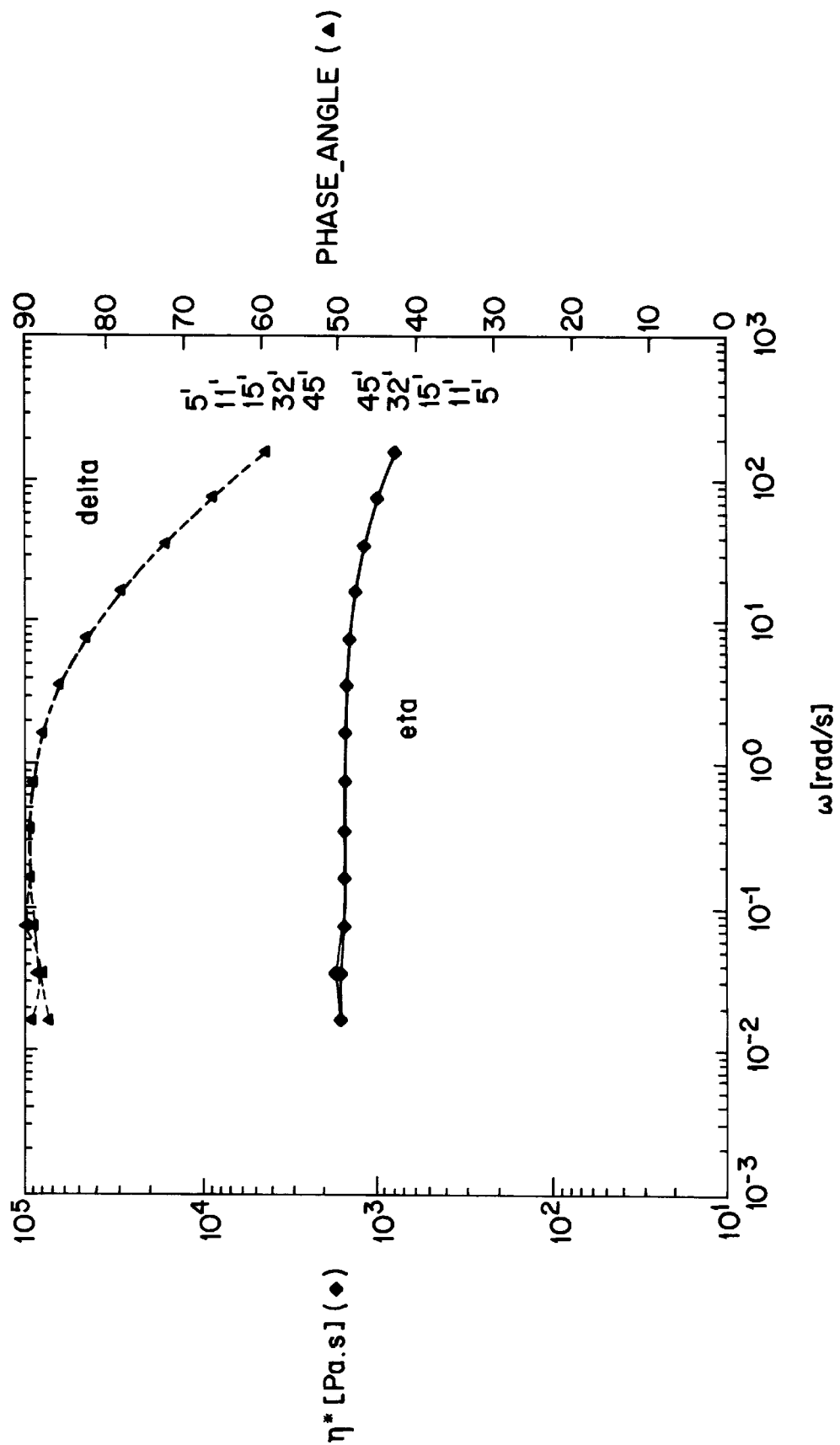

STAR-SHAPED BRANCHED POLYAMIDE

This is a continuation of International Appln. No. PCT/NL96/00188 filed May 2, 1996 which designated the U.S.

FIELD OF THE INVENTION

The invention relates to a star-shaped branched polyamide with at least 3 polyamide branches, which is formed from a multifunctional nucleus having functional groups chosen from the group comprising amine and carboxyl groups, and a process for the preparation thereof.

DESCRIPTION OF THE RELATED ART

Such star-shaped branched polyamides are known from J. R. Schaefgen and P. J. Flory, J. Am. Chem. Soc. 70, 2709–18 (1948), which describes star-shaped branched polyamides whose branches are formed in the polymerization of $\epsilon$-caprolactam and cyclohexanone tetraproprionic acid. Examples of star-shaped branched polyamides whose branches are initiated by amine groups are described in J. M. Warakomski, Chem. Mater. 1992, 4, 1000–1004 (1992). Here a star-shaped branched polyamide is obtained in the polymerization of $\epsilon$-caprolactam on tris(2-aminoethyl) amine, N,N-bis(2-aminoethyl)-N',N'bis[2-[bis(2-aminoethyl)amino]ethyl]-1,2-ethanediamine and the polyethylene imine dendrimer of the following generation.

The use of the aforementioned multifunctional core molecules however involves several drawbacks. It is not possible to obtain branches with high molecular weights using Flory's carboxylic acid core molecules, and, at the postpolymerization temperatures employed, molecular decomposition and crosslinking take place after some time and the fraction of linear polyamide increases. Warakomski's amine polymerization initiators present the drawback of slow polymerization initiation. There is a high risk of the formation of linear polyamide owing to contaminations and the number of branches formed is difficult to control. One of the conditions in she preparation of the star-shaped branched polyamide according to this state of the art is the complete absence of water. This necessitates long polymerization times and extra measures in comparison with the usual polymerization processes for $\epsilon$-caprolactam to polyamide-6. For this reason Warakomski makes use of the hydrochlorides of the amines. After the polymerisation these hydrochlorides must first be carefully removed, which means that extra operations and the necessary equipment are required.

BRIEF SUMMARY OF THE INVENTION

The aim of the invention is to provide a star-shaped branched polyamide which (a) can be obtained using the usual polymerization processes for linear polyamides, which (b) can be obtained with a high degree of polymerization which (c) shows no significant decomposition or crosslinking at the temperature at which the polymerization process takes place and which (d) also shows a good stability with respect to processing in the melt.

The inventors have now found that a star-shaped branched polyamide in which the amine or carboxyl groups of the core are bound (1) to an acyclic compound in which branching occurs, if it is branched, at a C atom or (2) via an acyclic chain tq a heterocyclic compound meets the above requirements and hence does not show or shows to only a small extent the drawbacks of the star-shaped branched polyamides according to the state of the art.

Because the star-shaped branched polyamide according to the invention can be produced, without further investments, in existing polymerization installations for the corresponding linear polyamide, an application in which use can be made of the low melt viscosity characteristic of star-shaped branched polyamides for, for example, injection-moulding thin-walled objects, has now come within reach.

DETAILED DESCRIPTION OF THE INVENTION

Suitable polyamides are polyamides of the so-called AB type, which can be obtained through polycondensation of $\alpha,\omega$-amino acids or through ring-opening polymerization of lactams. Examples are polyamide-4, polyamide-6, polyamide-8, etcetera.

Acyclic compounds are compounds having an open-chain molecular structure instead of a ring structure. Examples of such acyclic compounds are aliphatic hydrocarbons that are characterized by a straight or branched arrangement of the carbon atoms constituting the chain. Aliphatic hydrocarbons can be split up into alkanes, alkenes and acetylenes, which are saturated, unsaturated having a double bond, and unsaturated having a triple bond, respectively. In complex structures the chains may be branched or crosslinked. Examples of such branched or crosslinked compounds are branched aliphatic compounds, for example 4-aminomethyl-1,8-octanediamine. If the branched or crosslinked compounds contain atoms other than carbon, chain branching occurs at the C atoms only. Preferably use is made of branched aliphatic compounds. The length of the main chain may then vary within a wide range, for example between 2 and 40 carbon atoms, and the length of the side chains may vary between 1 and 20 carbon atoms; preferably the main chain is chosen to be not longer than 20 carbon atoms and the side chains are not longer than 10 carbon atoms. The distance between the carbon atoms in the main chain to which branches are bound is preferably at least 2 carbon atoms.

The amine or carboxyl group is preferably terminally bound to the aliphatic chains.

In principle, there is no limit to the number of functional groups per main chain, but preferably the number of groups is limited to 3–10.

The acyclic groups to which the initiator group is bound are preferably identical. The length of the acyclic chain to which the initiator group is bound is preferably chosen to be between 1 and 10 (carbon) atoms. If the chain is too short, there will be a risk of steric hindering, as a result of which it will not be possible for polyamide chains to be formed onto all the functional groups, whereas too long chains involve the risk of entanglement, which may hinder the formation of a regular star-shaped structure owing to shielding, among other factors.

Heterocyclic compounds are compounds having a closed ring structure where one or more of the ring's atoms is an element other than carbon, for example sulphur, nitrogen or oxygen. Examples are pyridine, pyrroles, furans, thiophene and purine. The heteroatoms present in the ring, however, affect the distribution of the electrons, as a result of which initiator groups bound to carbon atoms in the ring that are at different distances from heteroatoms have a different reactivity, which may result in irregular polymerization initiation and the formation of irregular star-shaped branched polyamides.

For this reason heterocyclic ring compounds showing point symmetry are particular suitable. Examples of such compounds are 1,3,5-triazines and 1,4 diazines, for example melamine and compounds derived therefrom and 2,3,5,6-tetraethylpyrazine, 1,4-piperazines and tetrathiaphulvalenes. In principle there is no limit to the number of functional groups bound via acyclic chains per heterocyclic ring compound, but 3–10 groups per heterocyclic ring compound is preferred.

The length of the acyclic chain to which the functional group is preferably terminally bound is preferably 1–10 atoms. The terminal functional group is preferably a carboxyl group.

Preferably use is made of 2,4,6-tris-aminocaproic acid-1, 3,5-triazine, in view of the simple and easily controllable way in which this compound can be obtained and the presence of aliphatic initiator groups that also correspond to the monomer for polyamide-6.

Preferably one type of functional group is present per core molecule. The presence of—or the possibility of—the formation of different functional groups must preferably be avoided because of the implied possibility of crosslinking.

The core molecule should be smaller than the polyamide branches. Preferably its molecular weight should be less than 2000, more preferably less than about 700.

The polyamide branches can be polymerized by the process usually used for the preparation of polyamides from $\alpha,\omega$-amino acids or through hydrolytic ring-opening polymerization of lactams, for example $\epsilon$-caprolactam or laurylolactam. These processes are described for example in Kunststoff-Handbuch Band VI, pp. 168–202, Carl Hanser Verlag, Munich (1966). Instead of the usual chain length regulators, the multifunctional core of the invention is now added.

The monomer:multifunctional core molar ratio is chosen so that the desired chain length is obtained at almost complete polymerization. This ratio is therefore partly dependent on the number of functional groups per core molecule. In general, this molar ratio will be between 10n and 250n, n being the number of functional groups per core molecule.

If $\epsilon$-caprolactam is used as the monomer, the star-shaped polyamide can for example also be synthesised using the process described by Flory c.s. The process according to the invention is however preferred.

In the process according to the invention for the preparation of star-shaped branched polyamides through the polymerization of a lactam in the presence of a multifunctional core compound the polymerization is carried out in the presence of water (0.5–30 mol. %, relative to the monomer) and optionally a catalyst, at atmospheric or elevated pressure, 0,1–3 MPa, at a temperature between 220 and 280° C., after which the polymerization is continued in the solid phase in a second reaction step, at reduced pressure and/or in an inert gas atmosphere, at a temperature between about 160° C. and about 10° C. below the melting temperature of the reaction product obtained in the first step, until a desired degree of polymerization is obtained. It has most surprisingly been found that, in the case of the process according to the invention, the reaction product obtained in the first step is already very tough and strong even after a relatively short polymerization time, its toughness and strength corresponding to those of the corresponding linear polyamide obtained after longer polymerization—this in contrast to the brittle product that is obtained with the process according to Flory c.s. Postcondensation in the solid phase results in a white product with polyamide branches that may have a very high molecular weight. High' is understood to mean $Mn \geq 5000$, preferably $\geq 7000$, or even more preferably $\geq 10,000$. The temperature of the first polymerization step is generally chosen to be between about 220 and 280° C. Preferably the reaction temperature is between about 230 and 275°, more preferably between about 240 and 270° C.

The pressure in the reactor is generally atmospheric, but may optionally be set to a value between 0.1 and 3 MPa (1–30 bar).

The amount of water present at the beginning of the polymerization is not critical; usually between 0.5 and 30 mol. % water is chosen, relative to the amount of monomer. An amount of between 5 and 15 mol. % is preferred.

The presence of the catalyst contributes to a short reaction time, as required to realise a desired degree of polymerization. In principle the catalysts usually used for hydrolytic polymerization are suitable in this case too. In the polymerization of caprolactam in particular aminocaproic acid is preferable. The amount of catalyst to be used for the polymerization may vary within a wide range, for example between 0.05 and 3 mol. %, relative to the monomer, preferably between 0.1 and 2 mol. %. If the acid catalyst simultaneously serves as a chain-terminating agent, the amount of catalyst to be used will be partly dependent on the desired molecular weight of the polyamide branches.

From the fact that the molecular weight or the degree of polymerization can still increase considerably in solid-phase after condensation it can be concluded that the product obtained after the first step in the polymerization process is a composition comprising a mixture of star-shaped branched polyamide and linear polyamide. The degree of polymerization of the polyamide branches of the star-shaped branched polyamide is about the same as that of the linear polyamides in the composition if the catalyst and the functional groups of the core molecule are identical and the reaction time is sufficient. As already mentioned, this composition has mechanical properties that correspond to those of a linear polyamide with a significantly higher degree of polymerization. For example, a polyamide composition with ductile fracture properties is obtained already after a polymerization time after which the corresponding linear polyamide still shows brittle fracture behaviour.

The invention therefore also relates to a tough polyamide composition substantially comprising a) a linear polyamide and b) a star-shaped branched polyamide. The degree of polymerization of the polyamide branches of the star-shaped branched polyamide must be at least half of that of the linear polyamide, preferably at least about the same as that of the linear polyamide.

More in particular the invention relates to a tough polyamide composition comprising a) a linear polyamide with a degree of polymerization that is insufficient for obtaining ductile fracture behaviour
b) a star-shaped branched polyamide with a degree of polymerization that is at least about the same as that of the linear polyamide.

It is also possible to obtain such tough polyamide compositions by mixing a linear polyamide and a star-shaped branched polyamide in the melt. The degree of polymerization of the star-shaped branched polyamide may then in principle be chosen independently of that of the linear polyamide. The process according to the invention is however strongly preferable.

The star-shaped branched polyamide according to the invention has a high thermal stability that manifests itself in for example a white polymer. Polyamides of the kind described by Warakomski show a yellowish brown discolouration.

The star-shaped branched polyamide according to the invention can easily be polymerized to a high molecular weight and will retain this high molecular weight even after long heating in the melt, without any increase in the melt viscosity—this in contrast to the star-shaped branched polyamides described by Flory c.s., which then show decomposition and crosslinking.

Also the short polymerization initiation time and the high polymerization rate are major advantages in the preparation according to the invention.

The detailed description and the experiments have been restricted to homopolyamide. However, it will be clear to a person skilled in the art that copolyamides are also within the scope of the invention and that the term 'polyamide' hence includes both homopolyamide and copolyamide.

Where mention is made of amine or carboxyl groups, those groups are understood to include groups that can yield amine and/or carboxyl groups under the polymerization conditions, for example esters and amides.

The invention will now be elucidated with reference to the following examples and comparative examples, without however being limited thereto.

EXAMPLE I a. Preparation of 2,4,6-trisaminocaproic acid-1,3,5-triazine (TACT)

A solution of 154 g (3.8 mol.) of sodium hydroxide and 335 g (2.56 mol.) of ε-aminocaproic acid in 600 ml of water was slowly added, drop by drop, with intensive stirring, to a suspension of 78.8 g (0.428 mol) of cyanuric chloride in 650 ml of ice water. The temperature was kept between 0 and 5° C. The stirring was continued for 2 hours at 0–5° C., after which the temperature was raised to 50° C. and maintained at that value for 4 hours, and finally the reaction mixture was kept at 100° C. for 1 hour, with constant stirring. Then the reaction mixture was brought to a pH of 4.5 with the aid of a 10% sulphuric acid solution, at 60° C. The precipitate formed was removed through filtration and rinsed with water. The melting point of the white powder was 186–8° C. Capillary electrophoresis revealed a purity of 97%.

b. Polymerisation of ε-caprolactam and the Core Compound TACT 100 grams of ε-caprolactam, 1 gram of ε-aminocaproic acid, 2 grams of water and different amounts of TACT (required for calculated branch lengths of 25 to 200 units) were mixed in a glass tube at 90° C. The tube was fitted with a reflux cooler and was heated to 260–270° C. in a nitrogen atmosphere and then kept at this temperature for 11 hours. After cooling, the tube was broken and its contents were ground and rinsed twice with boiling water to remove unreacted caprolactam. The polymer obtained was white.

Some of the mechanical properties of the rinsed polymer were measured, the melt viscosity was determined and also the intrinsic viscosity; the melt viscosity as a so-called zero viscosity at 230°, that is, the dynamic melt viscosity at 0 shearing force using a Rheometrix 800 parallel plate apparatus; the solution viscosity as a relative viscosity, $\eta_{rel}$, measured on a solution of 1 gram in 100 ml of 85% formic acid.

The mechanical properties were measured using injection-moulded specimens with the indicated standard test methods, using samples that were obtained by carrying out the above polymerization on a 500-grams scale.

The samples were dried for 24 hours at 80° C. under a vacuum before the tests. The results are shown in Table 1.

EXAMPLE II

Rinsed products obtained as described in Example Ib were subjected to postcondensation at reduced pressure, under a nitrogen vent, for 4 hours at 190° C. During this postcondensation a further increase in the molecular weight of the polyamide branches was observed (Table 2). Apparently the product that was obtained after the first reaction step still contained a substantial fraction of linear polyamide besides star-shaped branched polyamide. During the postcondensation process a final condition is asymptotically reached, at which no significant amount of linear polyamide is any longer present in addition to the star-shaped branched polyamide, and at which the melt viscosity has a constant value.

The melt viscosity shows Newtonian behaviour and is dependent on the shear rate to a small extent only. Only at branch lengths of 200 monomeric units does the melt viscosity start to increase at low shearing forces.

TABLE 1

| SAMPLE | LINEAR AKULON K136 | LINEAR AKULON K123 | LINEAR AKULON K120 | 1% TACT | 1.4% TACT | 2.8% TACT |
|---|---|---|---|---|---|---|
| Melt viscosity $\eta_o$ 230° C. [Pa · s] | 3000 | 400 | 150 | 350 | 200 | 59 |
| Izod [kJ/mm$^2$] ASTM D256 | 4.6 ± 0.5 | 5.8*[)] | 5.0 ± 0.5**[)] | 6.3 | 5.4 | |
| Flexural modulus [N/mm$^2$] ASTM D790 | 2850 ± 20 | — | | 2850 | 2830 | |
| Yield stress [N/mm$^2$] ASTM 638 | 76 ± 1 | 83 | | 78 | 78 | |
| Elongation at break [%] | 55 ± 20 | 16 | 5 | 50 | 30 | |
| $\eta_{rel}$ | 3.63 | 2.32 | 2.05 | 2.18 | 2.09 | 1.73 |
| Mn | 36000 | 18000 | 14000 | | | |

*[)]half of the samples shows brittle fracture
**[)]brittle fracture

TABLE 2

| branch length (calculated) | before post-condensation | | after post-condensation | |
|---|---|---|---|---|
| [monomeric units] | $\eta_o$ [Pa · s] | $\eta_{rel}$ | $\eta_o$ [Pa · s] | $\eta_{rel}$ |
| 50 | 61.3 | 1.73 | 120 | 1.77 |
| 100 | 196 | 2.09 | 1540 | 2.40 |
| 200 | 759 | 2.18 | 11900 | 2.98 |

It is noteworthy that whereas it was impossible to realise branch lengths of Mn≧5000 without crosslinking with the star-shaped branched polyamides of Flory c.s., this can be realized without problems with the star-shaped branched polyamide according to the invention, using conventional polymerization techniques.

BRIEF DESCRIPTION OF THE DRAWING

The star-shaped branched polyamide according to the invention shows a high melt stability. In 1 hour at 230° C. no changes were found to occur in the melt viscosity (see FIG. 1). FIG. 1 shows the meltviscosity ($\eta^*$) and the phase angle (Δ) as a function of rotation velocity in the dynamic melt viscosity measurement at 5, 11, 15, 32 and 35 minutes in the melt at 230° C.

EXAMPLE III

Example Ib was repeated, only 4-aminomethyl-1,8-octanediamine* (AMOD) was used instead of (TACT). Table 3 shows the results of the experiments.
* from Monsanto

TABLE 3

| | before post-condensation | | after post-condensation | |
|---|---|---|---|---|
| Branch length | $\eta_o$ [Pa · s] | $\eta_{rel}$ | $\Delta_o$ | $\Delta_{rel}$ |
| 50 | 34.0 | 1.66 | 66 | 1.74 |
| 100 | 371 | 2.02 | 1300 | 2.36 |
| 200 | 864 | 2.17 | 11240 | 2.96 |

These results are very similar to those of Table 2.

Comparative Experiment 1

Experiment Ib was repeated, only dendrimers were used as cores instead of (TACT). The dendrimers were the amine-terminated polypropylene imines of the first, second and third generation, having 4 and 8 amine terminal groups, respectively. (DAB(PPA)$_4$, 1,4-diaminobutane-N,N'-tetra-1-propylamine and DAB(PPA)$_8$.

The structure and preparation of these dendrimers, which show a close similarity to Warakomski's amine-terminated polyethylene imines, are described in for example Angew. Chem. Int. Ed. 32, 1308–1311 (1993).

A brown product with inferior properties was obtained; see Table 4.

TABLE 4

| Core wt. [%] | $\eta_o$ [Pa · s] | $\eta_{rel}$ | Tensile strength (N/mm$^2$) | Elongation at break [%] |
|---|---|---|---|---|
| DAB(PPA)$_4$, 0.7 | 6.7 | 1.50 | 57 ± 5 | 4.6 ± 0.5 |
| DAB(PPA)$_4$, 0.35 | 7.1 | 1.46 | 51 ± 3 | 4.2 ± 0.2 |
| DAB(PPA)$_4$, 0.18 | 9.8 | 1.51 | 39 ± 6 | 3.2 ± 0.5 |
| DAB(PPA)$_8$, 0.70 | 2.9 | 1.39 | 41 ± 3 | 3.5 ± 0.4 |
| DAB(PPA)$_8$, 0.35 | 3.85 | 1.40 | 56 ± 2 | 4.5 ± 0.5 |
| DAB(PPA)$_8$, 0.18 | 13 | 1.53 | 46 ± 2 | 3.6 ± 0.5 |

What we claim is:

1. A star-shaped branched polyamide including at least three polyamide branches emanating from a core, said core being formed from a multi-functional core molecule having amine groups, carboxyl groups or both, wherein the amine and carboxyl groups are bound
   (1) to an acyclic compound in which branching occurs, if it is branched, at a carbon atom or
   (2) via an acyclic chain to a heterocyclic compound.
2. A star-shaped branched polyamide according to claim 1, wherein the acyclic compound is a branched alkane.
3. A star-shaped branched polyamide according claim 1, wherein the heterocyclic compound shows point symmetry.
4. A star-shaped branched polyamide according to claim 1, wherein the heterocyclic compound is a triazine.
5. A star-shaped branched polyamide according to claim 4, wherein the triazine is a melamine derivative.
6. A star-shaped branched polyamide according to claim 1, wherein the acyclic chain bound to the heterocyclic compound is derived from aminocaproic acid.
7. A star-shaped branched polyamide according to claim 6, wherein the aminocaproic acid is 2,4,6-trisaminocaproic acid-1,3,5-triazine.

8. A star-shaped branched polyamide according to claim 2, wherein, before coupling, the core is 4-aminomethyl-1,8-octanediamine.

9. A polyamide composition comprising:
   a. a linear polyamide, and
   b. a star-shaped branched polyamide according to claim 1.

10. A process for the preparation of the polyamide composition according to claim 9, which process comprises polymerizing a lactam in the presence of said multifunctional core compound, water and optionally a catalyst, at a temperature between 220 and 280° C. and at atmospheric or elevated pressure.

11. A process according to claim 10, wherein
   a. the amount of said multifunctional core compound, relative to the lactam is 1:(10–250).n, where n is the number of functional groups per core molecule.
   b. the water content is between 0.5 and 30 mol. %, relative to the lactam, and
   c. the pressure is between 0.1 and 3.0 Mpa.

12. A process according to claim 10, wherein the catalyst is the $\alpha, \omega$-amino acid corresponding to the lactam.

13. A process according to claim 10, wherein the lactam is $\epsilon$-caprolactam.

14. A process according to claim 13, wherein the catalyst is aminocaproic acid.

15. A process according to claim 10, wherein the amount of catalyst is 0.05–3 mol. %, relative to the monomer.

16. A process for the preparation of a star-shaped melt stable branched polyamide comprising post-condensing a product obtained according to claim 10 in the solid phase under a vacuum or in an inert gas temperature, at a temperature between about 160° C. and 10° C. below the melting temperature of said product obtained by a method according to claim 10.

17. A product obtained by using the star-shaped branched polyamide according to any one of claims 1–8.

18. A product obtained by using a polyamide composition according to claim 9.

19. A star-shaped branched polyamide according to claim 1, wherein the core is formed from a compound molecule that has a molecular weight of less than 2000.

20. A star-shaped branched polyamide according to claim 1, wherein the core is formed from a compound that has a molecular weight of less than 700.

* * * * *